Aug. 29, 1967     R. S. EVANS     3,338,375
ARTICLE CONVEYOR SYSTEM
Filed March 14, 1966
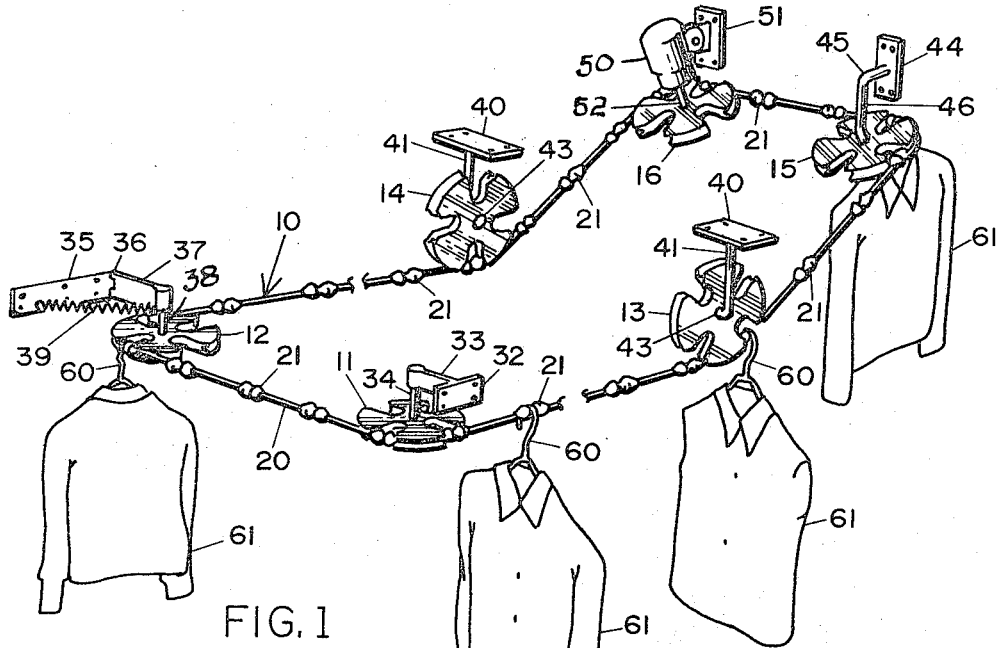
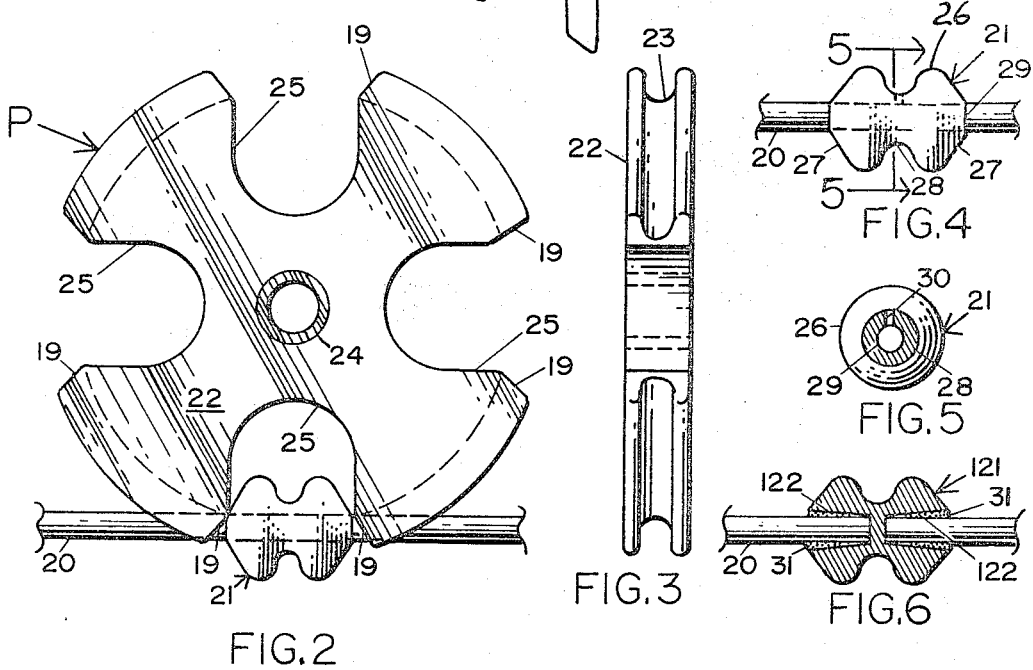
INVENTOR
RALPH S. EVANS
BY
Salvatore G. Militana,
attorney

United States Patent Office

3,338,375
Patented Aug. 29, 1967

3,338,375
ARTICLE CONVEYOR SYSTEM
Ralph S. Evans, 4711 NW. 170th St.,
Miami, Fla.
Filed Mar. 14, 1966, Ser. No. 533,952
1 Claim. (Cl. 198—130)

ABSTRACT OF THE DISCLOSURE

An article conveying system consisting of a plurality of identically constructed and rotatably mounted pulleys having a peripheral groove and a plurality of equally spaced peripheral slots or openings, an endless cable received in the peripheral grooves of the pulleys and a plurality of fittings mounted on the endless cable, each of the fittings being cylindrical in shape with taper at the ends and having an axially disposed bore for receiving the endless cable and a peripheral groove for receiving an article supporting member.

---

This invention relates to conveyor systems and is more particularly directed to such a system which conveys articles in a suspended or hanging position.

A principal object of the present invention is to provide an article conveyor system which is so flexible that it permits articles that have to be suspended or hung to be conveyed in any direction such as around corners, upwardly or downwardly and any distance.

Another object of the present invention is to provide a conveyor system with a plurality of pulleys having a peripheral groove for receiving an endless cable and a plurality of axially disposed openings at their periphery for receiving article holding fittings mounted on the cable, the pulleys being effective to propel the cable with articles being carried thereon notwithstanding the angle at which the pulleys are rotatably mounted.

A further object of the present invention is to provide an endless cable-type conveyor system for carrying articles that are suspended on hangers, hooks, etc. which conveyor system is simple in construction, inexpensive in cost and most effective to carry articles in any direction and for any distance without becoming fouled or entangled with the pulleys.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claim.

In the drawing:
FIGURE 1 is a perspective view of an article conveyor system constructed in accordance with my invention.
FIGURE 2 is a front elevational view of a pulley.
FIGURE 3 is an end view in elevation.
FIGURE 4 is a fragmentary view of a cable on which a cable fitting is shown.
FIGURE 5 is a cross sectional view taken along the line 5—5 of FIGURE 4.
FIGURE 6 is a cross sectional view similar to FIGURE 6 of a cable fitting for joining the ends of the cable.

Referring to the drawing wherein like numerals are used to designate similar parts throughout the various views, the numeral 10 refers to a conveyor system constructed in accordance with my invention showing in schematic fashion a plurality of pulleys P identified individually by the numerals 11, 12, 13, 14, 15 and 16 engaged by an endless cable 20 on which a plurality of cable or drive grip fittings 21 are mounted, all of the fittings 21 being equally spaced thereon.

The pulleys 11, 12, 13, 14, 15 and 16 are identical in construction and are each provided with conventional brackets of various construction for the purpose of mounting the pulleys in the desired position as determined by the direction of travel and attitude of the cable 20. All of the pulleys P consist of a circular body portion 22 having a peripheral groove 23 for receiving the cable 20 with a centrally disposed bushing 24 about which the pulley rotates. About the periphery of the pulleys P is a plurality of openings or slots 25 which receive the cable fittings 21 during the operation of the conveyor system. The number of slots 25 is determined by the circumference of the pulleys P and spacing of the fittings 21 since the fittings 21 must be received by slots 25 as the pulleys P rotate. The outer edges of the slots 25 are beveled as at 19 to engage the fittings 21 and either propel the cable 20 if the particular pulley is powered and be centered in the opening 25 in all events.

The fittings 21 consist of a cylindrical body portion 26 whose ends 27 are conical in shape with a peripheral groove 28 disposed at the midportion of the fitting 21. The fitting 21 is provided with an axially disposed bore 29 for receiving the cable 20 and with an axially disposed bore 30 into which cement or other adhesive is poured for fastening the fitting 21 on to the cable 20.

All of the fittings 21 mounted on the cable 20 are identical in construction except for one fitting 121 which joins the ends of the cable 20 to form an endless cable. As shown by FIGURE 6, the fitting 121 which connects the ends of the cable 20 is identical in size and outer configuration to the other fittings 21 and differs only in the centrally disposed bore. In the cable fitting 121, there are two axially disposed and conically shaped bores 122 enlarged at their outer ends and terminating short of the midportion of the fitting 121. The ends of the cable 20 are inserted into the openings 122 and then the remaining space in the conical bores 122 are filled with cement or other adhesive 31 to hold the ends of the cable 20 securely.

As shown by FIGURE 1, the pulleys P are secured to brackets which are mounted on walls or ceilings (not shown). The horizontally disposed pulley 11 is provided with a bracket plate 32 which is secured to a wall by bolts (not shown) extending through bores in the plate 32. An arm 33 extends outwardly from a midportion of the plate 32 having at its free end a shaft 34 mounted thereon. The shaft 34 is received by the bushing 24 of the pulley 11 whereby the pulley 11 is rotatably secured thereon.

The horizontally disposed pulley 12 is provided with a bracket which is spring tensioned to take up any slack in the endless cable 20. The bracket plate member 35 which is adapted to be secured to a wall having hinge means 36 at one end engaging similar hinge means on the end of an arm 37 at the free end of which a pulley shaft 38 is mounted. The shaft 38 is received by the bushing 24 of the pulley 12 and a tension coil spring 39 having its ends fastened to the bracket plate 35 and the hinged arm member 37 urges the pivotal movement of the arm 37 in the direction of the bracket plate member 35 so that the pulley 12 is held tightly against the cable 20.

The vertically disposed pulleys 13 and 14 are supported by identical brackets having a plate member 40 that is adapted to be fastened to a ceiling having a depending arm 41 at whose free end the end of a shaft 43 is secured. The horizontal shaft 43 rotatably supports the pulleys 13 and 14.

The obliquely disposed pulley 15 is supported by a bracket having a plate member 44 that is fastened to a wall having an arm 45 extending from the plate member 44. A shaft 46 which is mounted on the free end of the arm 45 is received by the bushing 24 of the pulley 15 for rotatably supporting the pulley 15 thereon.

The obliquely disposed pulley 16 is powered by a motor 50 which is secured to the bracket support plate 51 that can be fastened to a wall or similar support member. A motor shaft 52 extending from the motor 50 is received by the bushing 24 of the pulley 16 and can cause the rotation of the pulley 16 when powered by electric current.

In the normal operation of my conveyor system 10, the motor 50 is energized causing the pulley 16 to rotate. As the pulley 16 rotates, the slots 25 in the pulley 16 receive the fittings 21 as the trailing edge of each of the slots 25 engages the conical ends 27 of the fittings 21 and pushes against the fittings 21 to move the cable 20 forwardly. As the cable 20 moves along the conveyor system 10, a person at a certain station will place an article hanger supporting an article on the fittings 21 with the hanger reposing in the medially positioned groove 28. For illustrative purposes only, there is shown a clothing hanger 60 positioned on the fittings 21 with clothing 61 being moved from one station to another. Any hanger and any type of article may be used on my conveyor system such as hooks, clips, etc. for holding articles being sprayed, painted, dipped, dried, etc. The articles of clothing 61 are removed from the conveyor system at the discharge station which is in all likelihood at a distance from the station at which the clothing 61 were placed on the conveyor system 10. My system 10 is sufficiently flexible to permit the cable system to take any shape, go around corners, go upwardly or downwardly and the pulleys P may assume any angle to effect the direction of movement of the cable 20 without interfering with the hangers 60.

Having disclosed my invention, what I claim as new and desired to secure by Letters Patent of the United States is:

An article conveying system comprising a plurality of pulleys, means mounting said pulleys for rotational movement, each of said pulleys having a peripheral groove for receiving an endless cable and a plurality of axially disposed and substantially equally distanced openings extending from the periphery of said pulleys, an endless cable positioned in said grooves, a plurality of article suspending fittings secured on said endless cable, each of said fittings comprising a cylindrical body portion having tapering end portions, an axially disposed bore for receiving said cable and a peripheral groove extending about the midportion for receiving an article supporting member, said fittings being equally spaced on said endless cable and substantially distanced apart equal to the peripheral distance between said openings on said pulleys.

References Cited

UNITED STATES PATENTS

| | | | |
|---|---|---|---|
| 126,890 | 5/1872 | Lyons | 198—130 X |
| 548,261 | 10/1895 | Merriam et al. | 186—14 |
| 931,744 | 8/1909 | Farris | 198—189 X |
| 1,422,252 | 7/1922 | Boreiko | 198—130 |
| 2,101,685 | 12/1937 | Nisbet. | |
| 2,582,178 | 1/1952 | Thompson | 198—130 X |
| 3,134,481 | 5/1964 | Maimin | 198—130 X |

EVON C. BLUNK, *Primary Examiner.*

M. L. AJEMAN, *Assistant Examiner.*